United States Patent
Reese

(10) Patent No.: US 9,463,721 B2
(45) Date of Patent: Oct. 11, 2016

(54) HEAD REST FOR MOTOR VEHICLE SEATS

(71) Applicant: Faurecia Autositze GmbH, Stadthagen (DE)

(72) Inventor: Andreas Reese, Hohnhorst (DE)

(73) Assignee: Faurecia Autositze GmbH (DE)

( * ) Notice: Subject to any disclaimer, the term of this patent is extended or adjusted under 35 U.S.C. 154(b) by 0 days.

(21) Appl. No.: 14/362,621

(22) PCT Filed: Nov. 16, 2012

(86) PCT No.: PCT/EP2012/004778
§ 371 (c)(1),
(2) Date: Jun. 4, 2014

(87) PCT Pub. No.: WO2013/087144
PCT Pub. Date: Jun. 20, 2013

(65) Prior Publication Data
US 2014/0375100 A1    Dec. 25, 2014

(30) Foreign Application Priority Data

Dec. 14, 2011    (DE) .................. 10 2011 121 120

(51) Int. Cl.
*A47C 7/36*    (2006.01)
*B60N 2/44*    (2006.01)
*B60N 2/48*    (2006.01)

(52) U.S. Cl.
CPC ........... *B60N 2/4415* (2013.01); *B60N 2/4805* (2013.01); *B60N 2/4882* (2013.01)

(58) Field of Classification Search
CPC .... B60N 2/4808; B60N 2/4885; A47C 1/10; A47C 4/54; A47C 7/383
USPC .............. 297/406, 391, 452.41, 216.12, 397, 297/DIG. 3
See application file for complete search history.

(56) References Cited

U.S. PATENT DOCUMENTS 4,440,443 A * 4/1984 Nordskog ................. A47C 7/38
297/217.4
4,991,222 A * 2/1991 Nixdorf .................. H04R 5/023
297/391
(Continued)

FOREIGN PATENT DOCUMENTS

DE    102004003690    9/2004
DE    102004003390    8/2005
(Continued)

OTHER PUBLICATIONS

International Search Report in PCT Application PCT/EP2012/004778, EPO, Mar. 15, 2013.
(Continued)

*Primary Examiner* — David E Allred
*Assistant Examiner* — Alexander Harrison

(57) ABSTRACT

A head rest for motor vehicle seats has a center part and side parts that are arranged on either side of the center part and can be adjusted relative to the center part to provide lateral support of the head. At least one hollow body that can be filled with fluid is provided, by the filling of which the at least one side part is pivoted in the direction of the area in which the head is accommodated. Two lever arms pivotable about a respective pivot axis are provided, each having a first lever arm section and a second lever arm section arranged at the opposite end of the first lever arm section. The first of the lever arm sections lie in the stroke range of the hollow body and the second of the lever arm sections cooperates with a side part.

7 Claims, 3 Drawing Sheets

(56) References Cited

U.S. PATENT DOCUMENTS

| | | | | |
|---|---|---|---|---|
| 5,544,378 A | * | 8/1996 | Chow | A47C 7/383 297/397 |
| 6,139,106 A | * | 10/2000 | Aldridge | A61G 15/125 297/391 |
| 6,158,812 A | * | 12/2000 | Bonke | B60N 2/4805 297/216.12 |
| 6,398,303 B1 | | 6/2002 | Herrmann et al. | |
| 2005/0006941 A1 | * | 1/2005 | Park | B60N 2/4852 297/406 |
| 2005/0161993 A1 | * | 7/2005 | Flory | B60N 2/4882 297/406 |
| 2006/0267392 A1 | * | 11/2006 | Charnitski | B60N 2/4882 297/393 |
| 2008/0185894 A1 | * | 8/2008 | Yetukuri | B60N 2/4882 297/406 |
| 2009/0189430 A1 | * | 7/2009 | Schurg | B60N 2/4882 297/391 |
| 2009/0218858 A1 | | 9/2009 | Lawall et al. | |
| 2010/0117412 A1 | * | 5/2010 | Bicker | B60N 2/002 297/217.1 |
| 2012/0292973 A1 | * | 11/2012 | Westerink | B64D 11/06 297/391 |

FOREIGN PATENT DOCUMENTS

| | | |
|---|---|---|
| DE | 102007039063 | 2/2009 |
| DE | 102008030102 | 12/2009 |
| EP | 0142822 | 5/1985 |
| EP | 1817200 | 8/2007 |
| JP | 2008230265 | 10/2008 |

OTHER PUBLICATIONS

German Examination Report in Application 10 2011 121 120.2, German Patent Office, Jun. 29, 2012.
English Translation of Application WO2006/068571.

* cited by examiner

HEAD REST FOR MOTOR VEHICLE SEATS

TECHNICAL FIELD

The invention relates to a head rest for motor vehicle seats and more particularly, to a head rest having a center part and two side parts that are arranged on either side of the center part and which can be adjusted independently relative to the center part to provide lateral support for the head.

BACKGROUND INFORMATION

Known from JP 2008-230265, for example, is a head rest of the generic kind, where the side parts can pivot forward by inflating wedge-shaped inflatable bodies, in order to improve the lateral support of the head. For this purpose, the inflatable bodies are provided underneath the side parts, and each presses against a lever while inflating, one end of said lever being displaced against the rear of the side part, while the other end is being pressed against an elastically deformable body that generates a restoring force in the lever that pivots the lever back when the inflatable body is emptied and thereby compresses the inflatable body.

A head rest of the generic kind is also known from DE 10 2004 003 390 A1 in which the two side parts of a head rest are adjusted by air bags.

Other wedge-shaped inflatable bodies under the side parts of head rests are known from EP 1 817 200 B1 and DE 10 2008 030 102 A1, for example.

A disadvantage of these systems is that several inflatable bodies have to be used; at least one for each part of the head rest to be moved, thus requiring a complicated structure. In the known variations, the inflatable bodies are furthermore arranged on the sides of the head rest and are therefore accessible from the outside, such that influences from the outside can impair the operation of the adjustment.

SUMMARY OF THE INVENTION

The problem addressed by the present invention is, therefore, to provide a head rest of the aforementioned kind that is simple in its construction and can be manufactured compact and with few parts in order to implement the stated adjustment function.

The invention features a headrest having one single hollow cavity or hollow body that can be filled with fluid, the hollow body being in particular a bladder, which is provided behind the center part of the head rest on the side thereof that is pointing away from the head of the vehicle occupant. This hollow body is expandable such that it exerts a stroke. Lever arm sections that interact with or are connected to the side parts of the head rest are provided in the stroke area. When filling the hollow body, the lever arm sections and, together with them, the side parts are pivoted. It is also possible, for example, to provide one or more hollow bodies or hollow spaces for each lever arm section.

Bladders that are located on the outside can thus be avoided, in particular the arrangement can be designed compact, e.g., the hollow body can be provided in the area between the support rods of the head rest that are used to mount them to the back rest of a motor vehicle seat. Furthermore, the hollow body can be provided in a housing together with lever arm sections that interact with said hollow body such that it is not possible to reach into the kinematics from the outside.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
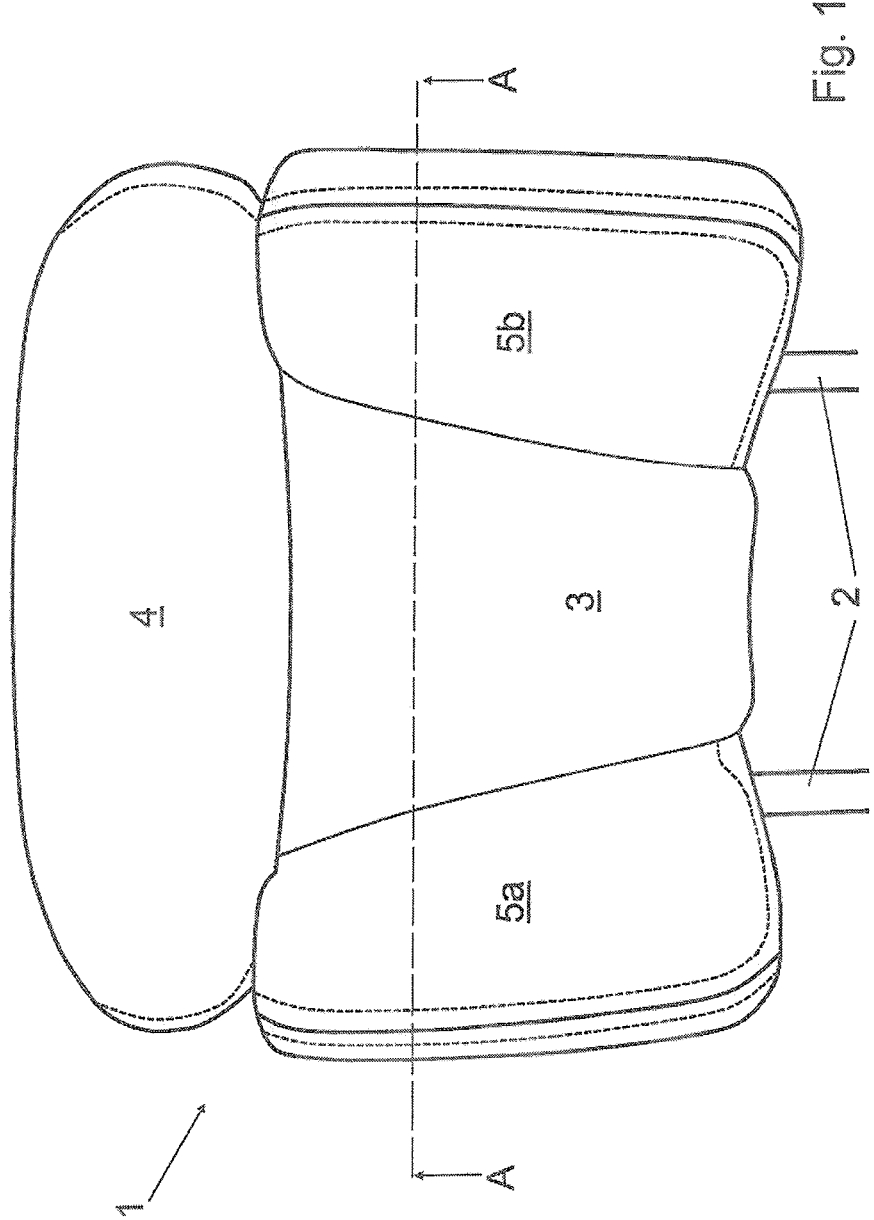
FIG. 1 is a front view of a head rest according to the invention.
Figure 2:
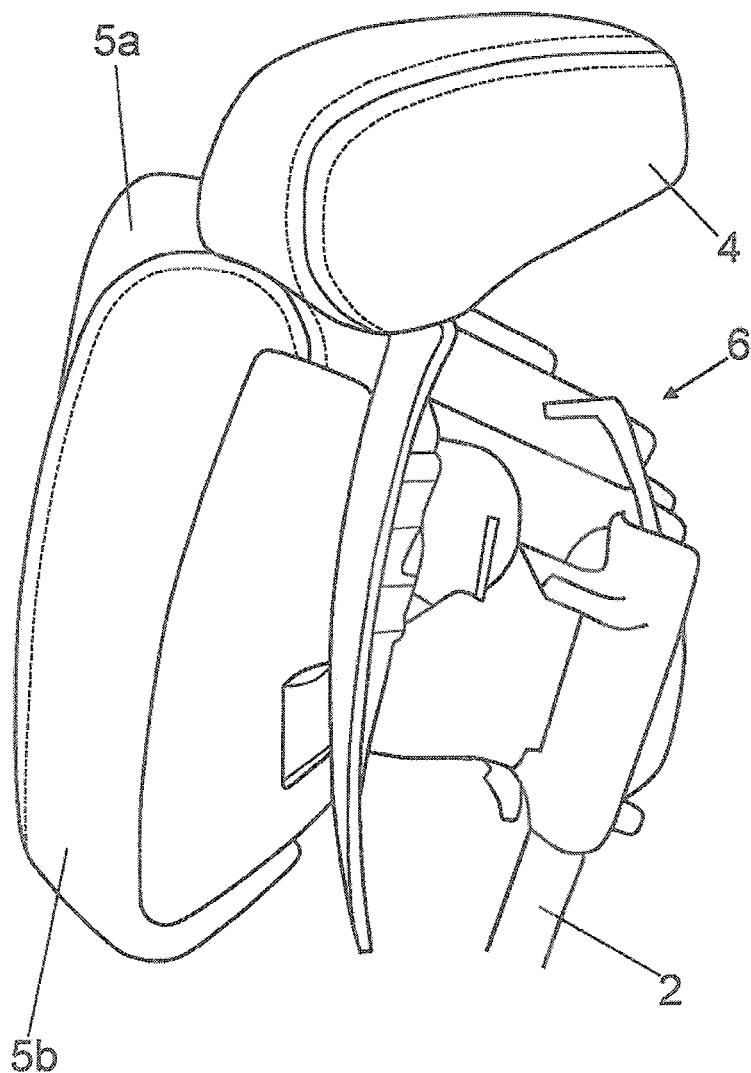
FIG. 2 is a side view of a head rest according to the invention.

The head rest 1 shown in FIGS. 1 and 2 has a center part 3 on which the head of the occupant (not shown) rests. Provided on the side thereof, i.e., perpendicular when viewed in the driving direction, are two movable side parts or side cheeks 5a, 5b. Not discussed in detail here, the head rest, on the end that toward the roof of the vehicle can also have an upper part 4 that can also be designed adjustably. The side parts 5a, 5b can be adjusted relative to the center part 3, in particular forward in the direction of the occupant's head. The head rest 1 is mounted at the back rest of a vehicle seat (not shown) using typical support rods 2.

A housing 6 is provided at the rear of the head rest 1, in particular connected to the center part, and surrounds an area behind the head rest, in particular also the support rods 2.

Figure 3:
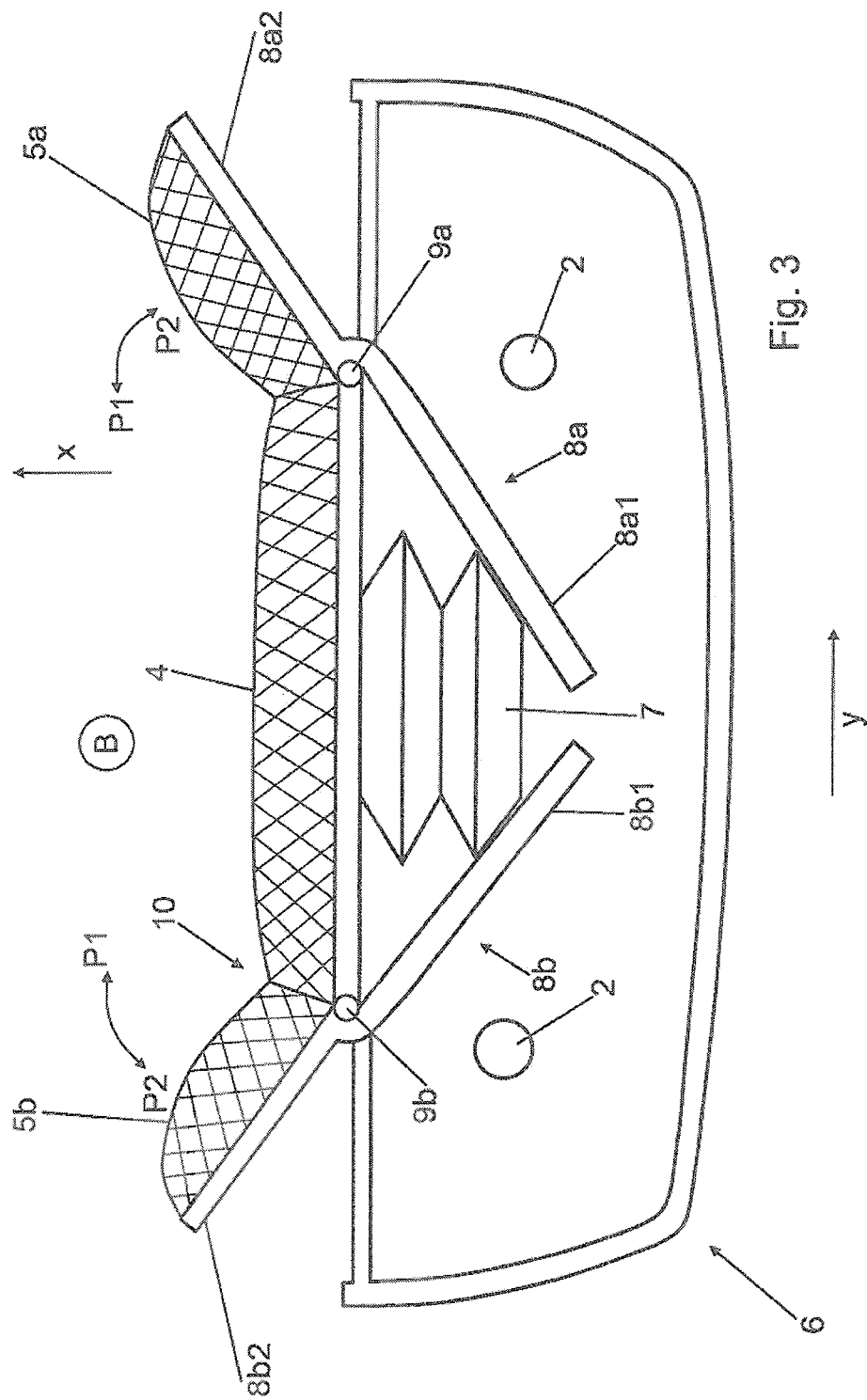
FIG. 3 is a cross-section view along lines A-A through the head rest shown in FIG. 1.

This becomes particularly clear in the section drawing of FIG. 3. The center part 4, which is connected to the housing 6, can be identified. With a side pointing in the driving direction X, the center part 4 is facing an area B where the head of the occupant is located. The side parts 5a, 5b, which are located in the perpendicular direction on each side adjacent to the center part 4, are supported pivotably around pivot axes 9a, 9b. The pivot axes 9a, 9b can be designed as trunions. Facing the area B, the center part 4 and side parts 5a, 5b carry cushions on their side for supporting and resting an occupant's head.

The two side parts 5a, 5b each interact with a lever 8a, 8b; the two side parts 5a, 5b are preferably connected to two lever arm sections 8a2, 8b2 of the levers 8a or 8b, respectively. Levers 8a, 8b are pivotably supported at the trunions 9a or 9b, respectively. Located on the side of the second lever arm sections that face away from the respective trunion 9a, 9b are exposed first lever arm sections 8a1 or 8b1, respectively. A hollow body 7 that can be filled with Fluid is provided on the side of the center part 4 that faces away from side B and that expands when filled with fluid, which can be a gas, a liquid or a gel, and which can compress when emptied. The hollow body 7, which is advantageously a bladder, particularly an air bladder, consequently has a certain stroke range. The first lever arm sections 8a1, 8b1 are arranged such that they are located, at least in part, in the stroke range of the hollow body 7. When it expands, levers 8a, 8b are as a result pivoted in the direction of arrow P1 and the side parts move in the direction of the occupant's head or the head accommodation area B, respectively.

When the hollow body 7 is emptied, the levers 8a, 8b can pivot in the direction P2 and the side parts can move away from the head accommodation area B. For this purpose, the levers 8a, 8b are preferably pre-tensioned when moving in the direction P1 such that when the hollow body 7 is evacuated, they pivot by themselves again in the direction P2. This pre-tensioning function can be enabled using a spring (not shown). On the other hand, the elasticity of the cushions of the side parts 5a, 5b and of the center part 4 can be utilized: The cushion pressure increases in the overhang section 10 between a side part 5a, 5b and the center part 4 when pivoted in the direction P1. When pivoted, a resultant force is generated in the direction P1 that counteracts the pivot movement and presses the side part again in the direction P2 when the hollow body collapses.

The arrangement with the hollow body 7 between the lever arm sections 8a1, 8b1 is very compact; furthermore, only one hollow body 7 is needed for adjusting both side parts 5a, 5b. This allows in particular for space-saving work by having the arrangement consisting of lever arm sections 8a1, 8b1 and the hollow body 7 located in the space between the support rods 2 of the head rest. The entire arrangement can then be encased in a housing 6 such that no mechanical components are accessible from the outside or the function cannot be interfered with from the outside.

Modified and substitutions by one of ordinary skill in the art are considered to be within the scope of the present invention, which is not to be limited except by the allowed claims and their legal equivalents.

The invention claimed is:

1. A head rest (1) for motor vehicle seats, said head rest (1) comprising:
   a center part (3) having two lateral sides opposite one another and defining first and second lateral edges, a user head accommodation area (B) and a rear portion opposite said user head accommodation area (B) and disposed between said two lateral sides;
   two pivotable side parts (5a, 5b), one of said two pivotable side parts (5a, 5b) disposed proximate each of said two lateral sides of the center part (3) along said first and second lateral edges of said center part (3) and pivotably adjustable toward and away from the center part (3) of said head rest (1);
   first and second pivot arms (8a, 8b) configured for pivoting around a respective pivot axis (9a, 9b), one of said first and second pivot arms (8a, 8b) disposed proximate each lateral edge of said center part, each of said first and second pivot arms (8a, 8b) having a first pivot arm section (8a1, 8b1) disposed proximate a first end of said first and second pivot arms (8a, 8b) and a second pivot arm section (8a2, 8b2) disposed proximate a second end of said first and second pivot arms (8a, 8b) opposite from said first end of said first and second pivot arms (8a, 8b) and to which is coupled said two side parts (5a, 5b) respectively;
   one hollow body (7) configured for being filled with fluid, said one hollow body (7) simultaneously pivoting both said first and second pivot arms (8a, 8b) and two pivotable side parts (5a, 5b) one hollow body (7) disposed against said rear portion of the center part (3) of the head rest and between said rear portion of the center part (3) and said first pivot arm sections (8a1, 8b1) of both said first and second pivot arms (8a, 8b); and
   wherein the second of the pivot arm sections (8a2, 8b2) are coupled to said two side parts (5a, 5b) and simultaneously actuate pivotable adjustment of both of said two side parts (5a, 5b) in relation to said center part (3) when said one hollow body (7) is filled with fluid, thereby causing both the first and second side parts (5a, 5b) to be simultaneously pivoted in the direction (P1) of the user head accommodation area (B).

2. The head rest (1) as in claim 1, characterized in that the hollow body (7) and the first pivot arm sections (8a1, 8b1) are accommodated in a housing (6).

3. The head rest (1) as in claim 2, characterized in that the housing (6) is mounted to the center part (3).

4. The head rest (1) as in claim 1, characterized in that the pivot axes (9a, 9b) are formed by trunions provided in one of the housing (6) and the center part (3).

5. The head rest (1) as in claim 1, characterized in that the hollow body (7) is an air bladder.

6. The head rest (1) as in claim 1, wherein said head rest (1) is mounted to a motor vehicle seat by means of first and second spaced apart support rods (2), and wherein the hollow body (7) is disposed in an area between the first and second spaced apart support rods (2).

7. The motor vehicle seat as in claim 6, characterized in that the hollow body (7), the first lever arm sections (8a1, 8a2) and at least sections of the support rods (2) are encased by a housing (6).

* * * * *